United States Patent
Chen et al.

(10) Patent No.: US 9,250,633 B2
(45) Date of Patent: Feb. 2, 2016

(54) AIR CONDITIONING CONTROL DEVICE AND METHOD THEREOF

(71) Applicant: Industrial Technology Research Institute, Hsinchu (TW)

(72) Inventors: Hsiang-Chieh Chen, Taichung (TW); Chung-Hsien Lu, Hsinchu County (TW); Ya-Ching Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 486 days.

(21) Appl. No.: 13/710,458

(22) Filed: Dec. 11, 2012

(65) Prior Publication Data

US 2013/0158722 A1    Jun. 20, 2013

(30) Foreign Application Priority Data

Dec. 14, 2011    (TW) .............................. 100146214 A

(51) Int. Cl.
G05D 23/19    (2006.01)
F24F 11/00    (2006.01)

(52) U.S. Cl.
CPC ............ *G05D 23/19* (2013.01); *F24F 11/0009* (2013.01); *G05D 23/1919* (2013.01); *F24F 2011/0075* (2013.01)

(58) Field of Classification Search
CPC ..................................................... G05D 23/19
USPC ................................................ 700/278, 276
See application file for complete search history.

(56) References Cited

U.S. PATENT DOCUMENTS 4,368,843 A    1/1983    Kai et al.
4,456,166 A    6/1984    Kagohata
(Continued)

FOREIGN PATENT DOCUMENTS

CN    1912484    2/2007
CN    101457968    6/2009
(Continued)

OTHER PUBLICATIONS

A New Fuzzy-based Supervisory Control Concept for the Demand-responsive Optimization of HVAC Control Systems p. 4258-4263 H.-B. Kuntze and Th. Bernard Proceedings of the 37th IEEE Conference on Decision & Control Tampa, Florida USA. Dec. 1998.*
(Continued)

Primary Examiner — Tejal Gami
(74) Attorney, Agent, or Firm — Jianq Chyun IP Office

(57) ABSTRACT

An air conditioning control device and a method thereof are provided, and the air conditioning control method includes the following steps. A plurality of predetermined state information and a current state information are generated according to environment states of a physical space, and a target state information is selected form the plurality of predetermined state information according to a minimum energy consumption. Moreover, the current state information and the target state information are utilized to generate a current effective temperature value and a target effective temperature value, and a set temperature value and a return-air temperature value are extracted from an air conditioning controller. The current effective temperature value, the target effective temperature value, the set temperature value and the return-air temperature value are utilized to execute fuzzy inference to generate a temperature fine-tuning value. The temperature fine-tuning value is utilized to adjust the set temperature value.

13 Claims, 6 Drawing Sheets

(56) References Cited

U.S. PATENT DOCUMENTS

| | | | |
|---|---|---|---|
| 4,562,954 A | | 1/1986 | Kajita |
| 4,815,657 A | | 3/1989 | Tsukuda |
| 5,135,045 A | | 8/1992 | Moon |
| 5,251,124 A | * | 10/1993 | Matsunaga .............. 700/71 |
| 5,478,276 A | | 12/1995 | Lee |
| 5,751,916 A | * | 5/1998 | Kon et al. ................. 706/2 |
| 5,769,314 A | * | 6/1998 | Drees et al. ............. 236/49.3 |
| 6,478,233 B1 | | 11/2002 | Shah |
| 6,619,061 B2 | * | 9/2003 | Beaverson et al. .......... 62/201 |
| 6,622,925 B2 | | 9/2003 | Carner et al. |
| 7,757,504 B2 | * | 7/2010 | Yonezawa et al. .......... 62/176.6 |
| 2004/0065098 A1 | | 4/2004 | Choi et al. |
| 2008/0319253 A1 | | 12/2008 | Ishiwata et al. |
| 2009/0222139 A1 | * | 9/2009 | Federspiel .............. 700/278 |
| 2010/0170282 A1 | | 7/2010 | Kim et al. |
| 2010/0250009 A1 | | 9/2010 | Lifson et al. |
| 2011/0005261 A1 | | 1/2011 | Lee et al. |

FOREIGN PATENT DOCUMENTS

| | | |
|---|---|---|
| CN | 201285137 | 8/2009 |
| CN | 201351980 | 11/2009 |
| CN | 101650063 | 2/2010 |
| CN | 101652732 | 2/2010 |
| CN | 101770243 | 7/2010 |
| CN | 102022798 | 4/2011 |
| JP | 2001280663 | 10/2001 |
| JP | 2004012006 | 1/2004 |
| JP | 2008269127 | 11/2008 |
| TW | 283486 | 8/1996 |
| TW | 354823 | 3/1999 |
| TW | 386152 | 4/2000 |
| TW | 398610 | 7/2000 |
| TW | 524959 | 3/2003 |
| TW | 593940 | 6/2004 |
| TW | 200521752 | 7/2005 |
| TW | M282125 | 12/2005 |
| TW | M287418 | 2/2006 |
| TW | M290975 | 5/2006 |
| TW | I257996 | 7/2006 |
| TW | I299390 | 8/2008 |
| TW | I300835 | 9/2008 |
| TW | I309705 | 5/2009 |
| TW | 200925525 | 6/2009 |
| TW | M358951 | 6/2009 |
| TW | M369438 | 11/2009 |
| TW | M371223 | 12/2009 |
| TW | 201000829 | 1/2010 |
| TW | I320470 | 2/2010 |
| TW | M377487 | 4/2010 |
| TW | 201017072 | 5/2010 |
| TW | 201027014 | 7/2010 |
| TW | M394493 | 12/2010 |
| TW | 201107684 | 3/2011 |
| TW | I348533 | 9/2011 |

OTHER PUBLICATIONS

"Office Action of China Counterpart Application," issued on Dec. 2, 2014, p. 1-p. 5.

"Office Action of Taiwan counterpart application" issued on Nov. 21, 2013, p. 1-p. 4.

Kolokotsa et al., "Predictive control techniques for energy and indoor environmental quality management in buildings", Building and Environment, Dec. 2008, vol. 44, p. 1850-p. 1863.

Florides et al., "Measures used to lower building energy consumption and their cost effectiveness", Applied Energy, Oct. 2002, vol. 73, p. 299-p. 328.

Dounis et al., "Advanced control systems engineering for energy and comfort management in a building environment—A review", Renewable and Sustainable Energy Reviews, Sep. 2008, vol. 13, p. 1246-p. 1261.

Doukas et al., "Intelligent building energy management system using rule sets", Building and Environment, Oct. 2006, vol. 42, p. 3562-p. 3569.

Clarke et al., "Simulation-assisted control in building energy management systems", Energy and Buildings, Oct. 2002, vol. 34, p. 933-p. 940.

Mathews et al., "A tool for integrated HVAC, building energy and control analysis Part 1: overview of QUICK control", Building and Environment, Jun. 1998, vol. 34, p. 429-449.

* cited by examiner

AIR CONDITIONING CONTROL DEVICE AND METHOD THEREOF

CROSS-REFERENCE TO RELATED APPLICATION

This application claims the priority benefit of Taiwan application serial no. 100146214, filed on Dec. 14, 2011. The entirety of the above-mentioned patent application is hereby incorporated by reference herein and made a part of this specification.

TECHNICAL FIELD

The disclosure relates to an air conditioning control device and a method thereof.

BACKGROUND

In recent years, other than the improvement in energy efficiency of equipment itself, there is an increasing number of buildings introducing energy management system to execute the intelligence management on energy consumption, such as schedule controlling or scenario controlling on air conditioning, lighting, heat exchange systems etc., and the potential energy saving may be further promoted via the energy information and communication technology (EICT) and the combination of sensors, controllers, embedded systems and energy managements.

The majority of current heating, ventilation and air conditioning (HVAC) systems control the airflow and the chilled-water flow thereof by the difference between the set temperature value and the return-air temperature value. However, the sensors detecting the return-air temperature value is not located in the actual field environment or the sensors have insufficient quantities to response the actual distribution state in the space. Therefore, the return-air temperature value obtained by the HVAC system is often unable to indicate the real state of the field environment and the actual feeling of personnel in the space. Furthermore, as regards the control on the set temperature value, the field personnel usually has to manually adjust the set temperature value stored in the HVAC system, in real-time, thereby resulting the system being used inconveniently.

In other words, at present, the large-scaled air conditioning control devices are often unable to obtain the real state with reference value, thereby causing difficulties in controlling the air handling unit (AHU) or the fan coil unit (FCU) inside the large-scaled air conditioning control device, and also causing the field environment being undercooling/overheating with the occurrence of energy-waste. Furthermore, the majority of large-scaled air conditioning control devices currently have to rely on the field personnel's experience to manually adjust the set temperature, thereby resulting the device being used inconveniently.

SUMMARY

One of exemplary embodiments comprises an air conditioning control method for an air conditioning control device, and the air conditioning control method includes the following steps. Firstly, a plurality of predetermined state information corresponding to a target comfort index are generated according to environment states outside a physical space. Moreover, a current state information is generated according to environment states within the physical space. When the current state information is different from the plurality of predetermined state information, the current state information and the plurality of predetermined state information are utilized to calculate a plurality of energy consumptions required by the conversion of states, and a target state information is selected from the plurality of predetermined state information according to a minimum energy consumption. Furthermore, the current state information and the target state information are utilized to generate a current effective temperature value and a target effective temperature value, and a set temperature value and a return-air temperature value are extracted from an air conditioning controller in the air conditioning control device. Next, the current effective temperature value, the target effective temperature value, the set temperature value and the return-air temperature value are utilized to execute fuzzy inference, so as to generate a temperature fine-tuning value, and the temperature fine-tuning value is utilized to adjust the set temperature value.

One of exemplary embodiments comprises an air conditioning control device including a wireless sensing module, an effective temperature calculator, an air conditioning controller, a fuzzy inference system and an adder. The wireless sensing module generates a plurality of predetermined state information corresponding to a target comfort index according to environment states outside a physical space, and generates a current state information according to environment states within the physical space. Wherein, when the current state information is different from the plurality of predetermined state information, the effective temperature calculator utilizes the current state information and the plurality of predetermined state information to calculate a plurality of energy consumptions required by the conversion of states, and selects a target state information from the plurality of predetermined state information according to a minimum energy consumption.

Moreover, the effective temperature calculator utilizes the current state information and the target state information to generate a current effective temperature value and a target effective temperature value. The fuzzy inference system extracts a set temperature value and a return-air temperature value from the air conditioning controller, and utilizes the current effective temperature value, the target effective temperature value, the set temperature value and the return-air temperature value to execute fuzzy inference, so as to generate a temperature fine-tuning value. The adder adds the temperature fine-tuning value and the set temperature value together, and accordingly generates a corrected temperature vale. Moreover, the air conditioning controller utilizes the corrected temperature value to update the set temperature value.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
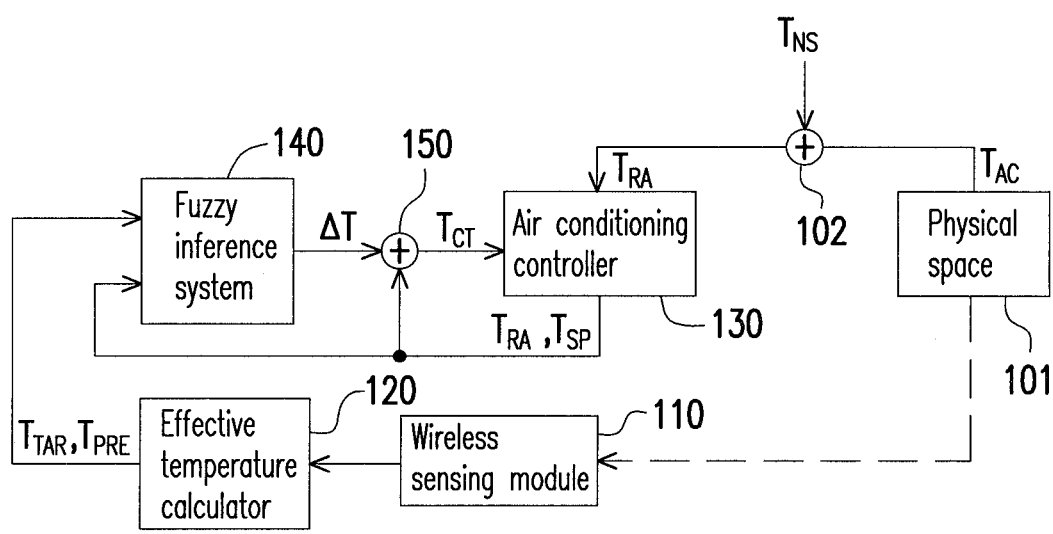
FIG. 1 is a system schematic diagram of an air conditioning control device according to an embodiment of the disclosure.

FIG. 1 is a system schematic diagram of an air conditioning control device according to an embodiment of the disclosure. Referring to FIG. 1, the air conditioning control device includes a wireless sensing module 110, an effective temperature calculator 120, an air conditioning controller 130, a fuzzy inference system 140 and an adder 150. Wherein, the air conditioning control device sets the operating parameters thereof according to a set temperature value $T_{SP}$, and utilizes the operating parameters to control the opening of a chilled-water valve inside the air conditioning control device. Accordingly, the air conditioning control device may further adjust the flows of the chilled and heated water inside the air conditioning control device, thereby achieving to adjust environment states of a physical space 101, such as large shopping centers.

More specifically, the set temperature value $T_{SP}$ is stored in the air conditioning controller 130. Moreover, the air conditioning controller 130 may obtain a return-air temperature value $T_{RA}$ through a sensor (not shown) disposed on a return-air vent of the air conditioning control device. Since there is a distance between the return-air vent of the air conditioning control device and the physical space, the return-air temperature value $T_{RA}$ detected by the sensor is not equivalent to an actual temperature value $T_{AC}$ of the physical space 101. As such, in the actual application, FIG. 1 through an adder 102 indicates that the return-air temperature value $T_{RA}$ is substantially equivalent to the actual temperature value $T_{AG}$ added on a temperature disturbance value $T_{NS}$.

The air conditioning control device may generate a current effective temperature value $T_{PRE}$ and a target effective temperature value $T_{TAR}$ through the wireless sensing module 110 and the effective temperature calculator 120. Moreover, the fuzzy inference system 140 utilizes the four temperatures (that is, the set temperature value $T_{SP}$, the return-air temperature value $T_{RA}$, the current effective temperature value $T_{PRE}$ and the target effective temperature value $T_{TAR}$) to generate a temperature fine-tuning value $\Delta T$. Accordingly, the air conditioning control device may utilize the temperature fine-tuning value $\Delta T$ to adjust the set temperature value $T_{SP}$ automatically, thereby preventing to adjust the set temperature value $T_{SP}$ manually.

Figure 2:
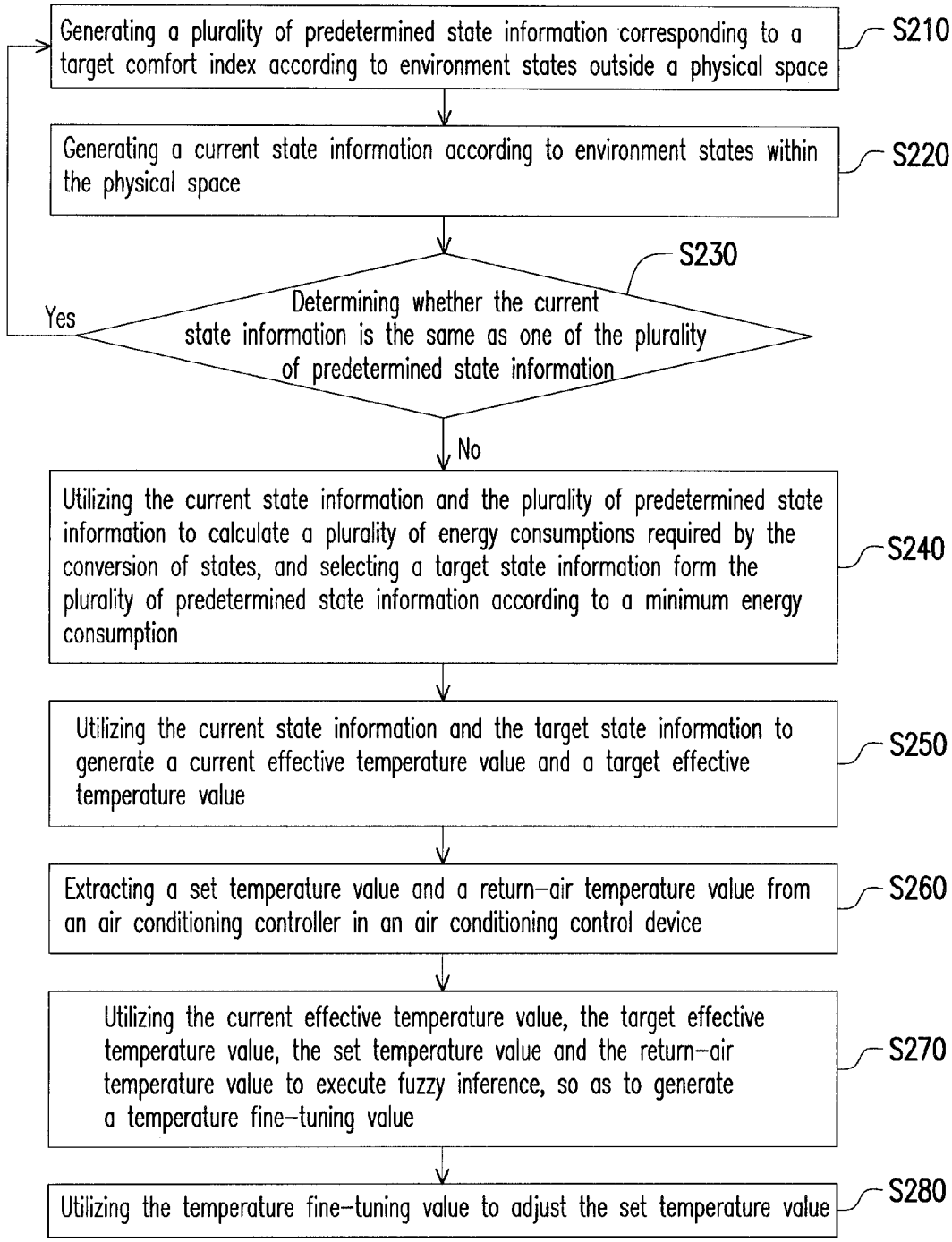
FIG. 2 is a flow chart diagram of an air conditioning control method according to an embodiment of the disclosure.

FIG. 2 is a flow chart diagram of an air conditioning control method according to an embodiment of the disclosure. The following description may be referred to FIG. 1 and FIG. 2 simultaneously, in order to observe the detailed operation of the air conditioning control device. Here, as shown in step S210 and step S220, the wireless sensing module 110 may generate a plurality of predetermined state information corresponding to a target comfort index according to environment states outside the physical space 101, and generate a current state information according to environment states within the physical space 101.

Figure 3:
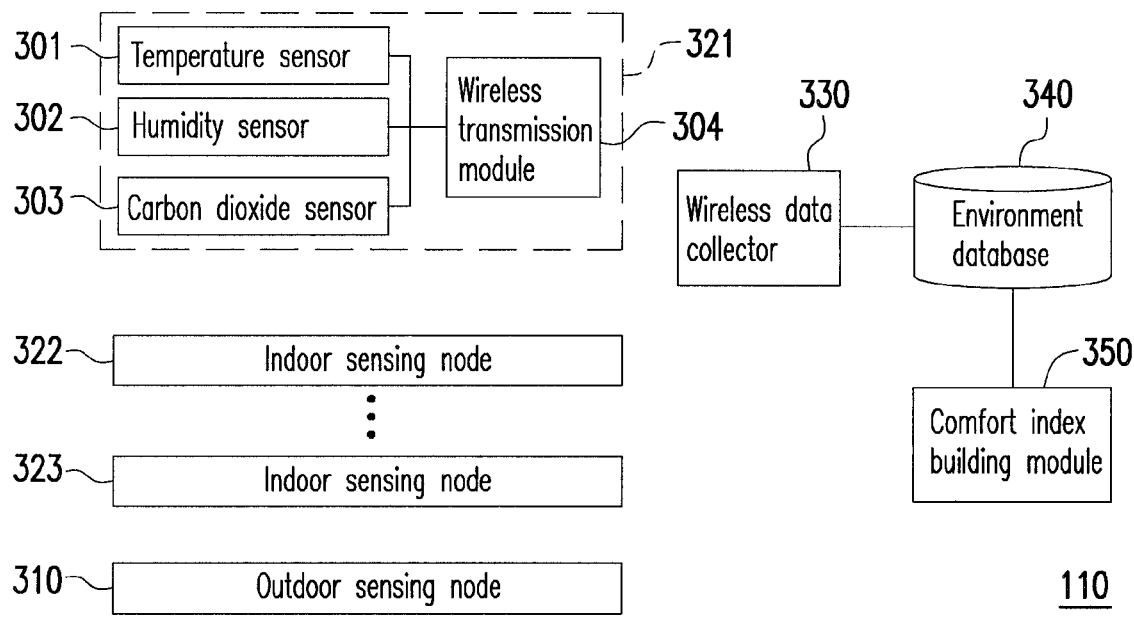
FIG. 3 is a schematic diagram of a wireless sensing module according to an embodiment of the disclosure.
Figure 4:
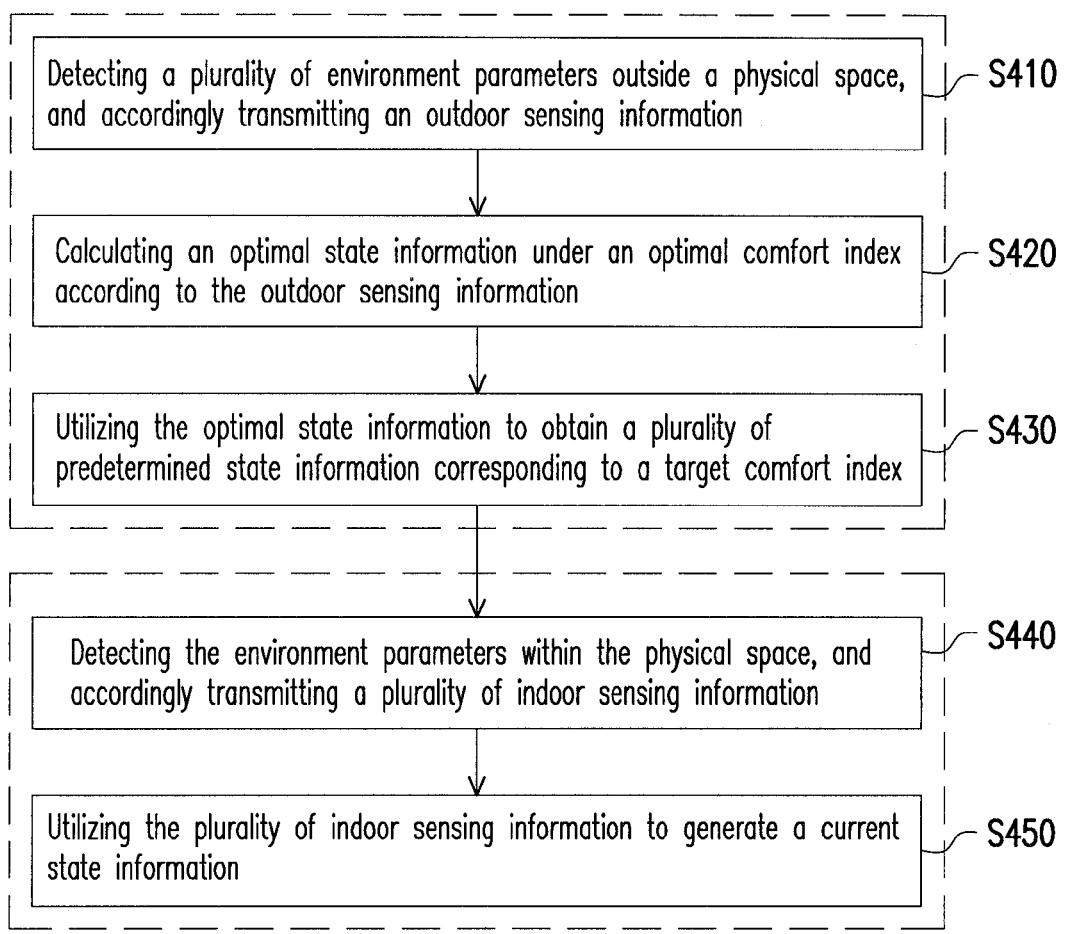
FIG. 4 is a flow chart diagram illustrating step S210 and step S220 in FIG. 2.

For example, FIG. 3 is a schematic diagram of a wireless sensing module according to an embodiment of the disclosure, and FIG. 4 is a flow chart diagram illustrating step S210 and step S220 in FIG. 2. The following description may be referred to FIG. 3 and FIG. 4, in order to observe the structure and operation of the wireless sensing module 110 in detail. Here, the wireless sensing module 110 includes an outdoor sensing node 310, a plurality of indoor sensing nodes 321~323, a wireless data collector 330, an environment database 340 and a comfort index building module 350. Wherein, the outdoor sensing node 310 is disposed outside the physical space 101, and the indoor sensing nodes 321~323 are disposed within the physical space 101.

Moreover, the environment parameters detected by the outdoor sensing node 310 and the indoor sensing nodes 321~323 include a temperature, a humidity and a carbon dioxide concentration. The outdoor sensing node 310 and the indoor sensing nodes 321~323 have the same circuit structure. For instance, the indoor sensing node 321 is taken as an example, where the indoor sensing node 321 includes a temperature sensor 301, a humidity sensor 302, a carbon dioxide sensor 303 and a wireless transmission module 304. Wherein, the temperature sensor 301 is configured to detect a temperature of a surrounding environment, and accordingly generate a temperature data. The humidity sensor 302 is configured to detect a humidity of the surrounding environment, and accordingly generate a humidity data. The carbon dioxide sensor 303 is configured to detect a carbon dioxide concentration of the surrounding environment, and accordingly generate a carbon dioxide concentration data.

Moreover, the wireless transmission module 304 may collect the temperature data, the humidity data and the carbon dioxide concentration data into an indoor sensing information, and the indoor sensing information is wirelessly transmitted to the wireless data collector 330. Similarly, the outdoor sensing node 310 may also transmit an outdoor sensing information collected from the temperature data, the humidity data and the carbon dioxide concentration data to the wireless data collector 330. Therefore, as shown in step S410, the outdoor sensing node 310 may detect a plurality of environment parameters outside the physical space 101, and accordingly transmit an outdoor sensing information.

On the other hand, the wireless data collector 330 may receive the outdoor sensing information and store the outdoor sensing information in the environment database 340. Moreover, as shown in step S420, the comfort index building module 350 may calculate an optimal state information under an optimal comfort index according to the outdoor sensing information. For instance, when the temperature data, the humidity data and the carbon dioxide concentration data in the outdoor sensing information are {30° C., 70%, 400 ppm} respectively, the comfort index building module 350 may calculate the temperature data, the humidity data and the carbon dioxide concentration data under the optimal comfort index, such as {25.5° C., 60%, 1000 ppm}, which is defined as an optimal state information.

Noteworthily, the comfort index is quantified into a value of 0-100%, where the optimal comfort index is 100%. Moreover, the comfort index above 80%, generally speaking, is an acceptable range for most people. As such, in the actual application, the comfort index building module 350 utilizes the optimal state information to extract a plurality of predetermined state information corresponding to a target comfort index (such as 80%) form the environment database 340, as shown in step S430. Wherein, each of the predetermined state information includes a temperature data, a humidity data and a carbon dioxide concentration data.

Furthermore, as shown in step S440, the indoor sensing nodes 321~323 may detect a plurality of environment parameters within the physical space 101, and accordingly transmit a plurality of indoor sensing information, wherein each of the plurality of indoor sensing information includes a temperature data, a humidity data and a carbon dioxide concentration data. Moreover, the wireless data collector 330 may receive the plurality of indoor sensing information and store the plurality of indoor sensing information in the environment database 340. Furthermore, as shown in step S450, the comfort index building module 350 may generate the current state information according to the plurality of indoor sensing information.

For example, if the wireless sensing module 110 includes N indoor sensing nodes, where N is an integer greater than 0, there will be N indoor sensing information $DS_1 \sim DS_N$ stored in the environment database 340, and $DS_i\{T_i, RH_i, CO2_i\}$ is configured to indicate the temperature data, the humidity data and the carbon dioxide concentration data in the $i^{th}$ indoor sensing information. In an embodiment, the comfort index building module 350 extracts a plurality of temperature data $\{T_1, T_2, \ldots T_N\}$ from the plurality of indoor sensing information $DS_1 \sim DS_N$, and selects a maximum temperature data from the plurality of temperature data $\{T_1, T_2, \ldots T_N\}$. The maximum temperature data is set to be the temperature data in the current state information. Similarly, the comfort index building module 350 may select a maximum humidity data from a plurality of humidity data $\{RH_1, RH_2, \ldots, RH_N\}$ in the plurality of indoor sensing information $DS_1 \sim DS_N$, and the maximum humidity data is set to be the humidity data in the current state information. Moreover, the comfort index building module 350 may select a maximum carbon dioxide concentration data from a plurality of carbon dioxide concentration data $\{CO2_1, CO2_2, \ldots, CO2_N\}$ in the plurality of indoor sensing information $DS_1 \sim DS_N$, and the maximum carbon dioxide concentration data is set to be the carbon dioxide concentration data in the current state information.

Referring to FIG. 1 and FIG. 2 again, regarding the current state information and the plurality of predetermined state information obtained by the wireless sensing module 110, the effective temperature calculator 120 determines whether the current state information is the same as one of the plurality of predetermined state information, as shown in step S230. If the current state information is the same as one of the plurality of predetermined state information, it is indicated that the air conditioning control device may not need to adjust the set temperature value $T_{SP}$. Hence, at this time, return to step S210. Accordingly, the wireless sensing module 110 transmits the updated current state information and the updated predetermined state information to the effective temperature calculator 120. Contrarily, as shown in step S240, when the current state information is different from the plurality of predetermined state information, the effective temperature calculator 120 utilizes the current state information and the plurality of predetermined state information to calculate a plurality of energy consumptions required by the conversion of states, and selects a target state information form the plurality of predetermined state information according to a minimum energy consumption.

Figure 5:
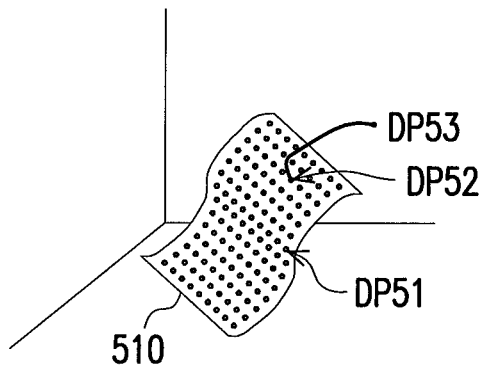
FIG. 5 is a schematic diagram of a three-dimensional coordinate system for state information according to an embodiment of the disclosure.

For example, FIG. 5 is a schematic diagram of a three-dimensional coordinate system for state information according to an embodiment of the disclosure. Referring to FIG. 5, an X-axis and a Y-axis, and a Z-axis of the three-dimensional coordinate system are configured to indicate the temperature data, the humidity data and the carbon dioxide concentration data, respectively. Therefore, each dot on the coordinate system may be represented as one of the plurality of state information. Correspondingly, the plurality of predetermined state information labeled on the three-dimensional coordinate system such as DP51 and DP52, may form a hyper plane 510, and DP53 is configured to indicate the current state information.

In an embodiment, the effective temperature calculator 120 may select the plurality of predetermined state information individually and utilize the selected predetermined state information and the current state information to calculate an energy consumption, where the energy consumption includes the energy required for a temperature variation, a humidity variation and a carbon dioxide concentration variation. For instance, if the selected predetermined state information is {25° C., 75%, 1000 ppm} and the current state information is {27° C., 80%, 1200 ppm}, the effective temperature calculator 120 may calculate the required energy for adjusting the temperature of the physical space 101 from 27° C. to 25° C., and calculate the required energy for adjusting the humidity of the physical space 101 from 80% to 75%, and also calculate the required energy for adjusting the carbon dioxide concentration of the physical space 101 from 1200 ppm to 1000 ppm.

Moreover, in the actual application, searching for the minimum energy consumption is the concept of relative value, and only the magnitudes of energies for the state conversions are needed to compare. Therefore, the air-side estimation may be utilized to compare the required energies for the temperature variation and the humidity variation. For instance, under the air-side estimation, the heat exchange quantity of the air-side is proportional to the product of air flow (or the indoor space occupied by gas) and temperature difference, and the required energy for the humidity variation is the energy required for removing the moisture (content) in the air. Furthermore, the calculation of the required energy for the carbon dioxide concentration variation has to firstly convert the size of the physical space 101 into the required total ventilation-volume, and then the required electrical energy for fans in the air conditioning control device may be figured out by the total ventilation-volume. Moreover, when the amount of ventilation supplied by the air conditioning control device is excessive, the temperature difference also has to be considered. This is because the air conditioning control device needs additional energy to cool down the external air if the temperature variation is overly large. Therefore, a penalty factor also has to be added into the calculation of the required energy for varying the carbon dioxide concentration, in order to compensate the required energy for cooling down the external air.

When the effective temperature calculator 120 calculates energy consumptions between the current state information and each of the plurality of predetermined state information, the effective temperature calculator 120 selects a minimum energy consumption and selects a corresponding predetermined state information according to the minimum energy consumption, so as to be the target state information. For instance, as shown in FIG. 5, if the energy consumption calculated by the effective temperature calculator 120 utilizing the current state information DP53 and the predetermined state information DP52 is the minimum value, the predetermined state information DP52 is set to be the target state information.

Referring to FIG. 1 and FIG. 2 again, as shown in step S250, after obtaining the target state information, the effective temperature calculator 120 may utilize the current state information and the target state information to generate the current effective temperature value $T_{PRE}$ and the target effective temperature value $T_{TAR}$. Since the current state information and the target state information respectively includes a temperature data, a humidity data and a carbon dioxide concentration data, the current effective temperature value $T_{PRE}$ and the target effective temperature value $T_{TAR}$ calculated by the effective temperature calculator 120 includes the contribution of the three environment factors (the temperature, the humidity and the carbon dioxide concentration). In other words, the effective temperature values calculated by the effective temperature calculator 120 can represent the temperature that the human body actually feels. This is because the temperature that the human body actually feels increases as the humidity and the carbon dioxide concentration increase, under the same temperature values. Moreover, the temperature that the human body actually feels decreases as the humidity and the carbon dioxide concentration decrease, under the same temperature values.

More specifically, as shown in step S260, the fuzzy inference system 140 may extract the set temperature value $T_{SP}$ and the return-air temperature value $T_{RP}$ from the air conditioning controller 130. Moreover, as shown in step S270, the fuzzy inference system 140 may utilize the current effective temperature value $T_{PRE}$, the target effective temperature value $T_{TAR}$, the set temperature value $T_{SP}$ and the return-air temperature value $T_{RP}$ to execute fuzzy inference, so as to generate the temperature fine-tuning value $\Delta T$.

Figure 6:
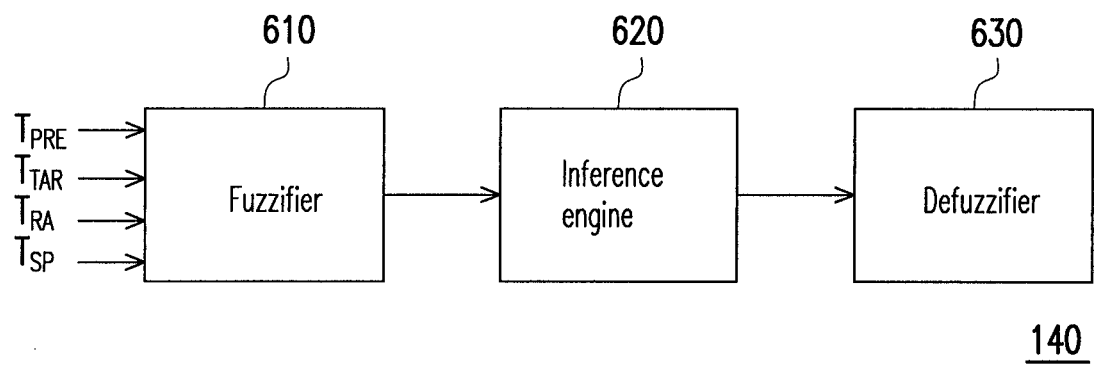
FIG. 6 is a schematic diagram of a fuzzy inference system according to an embodiment of the disclosure.
Figure 7:
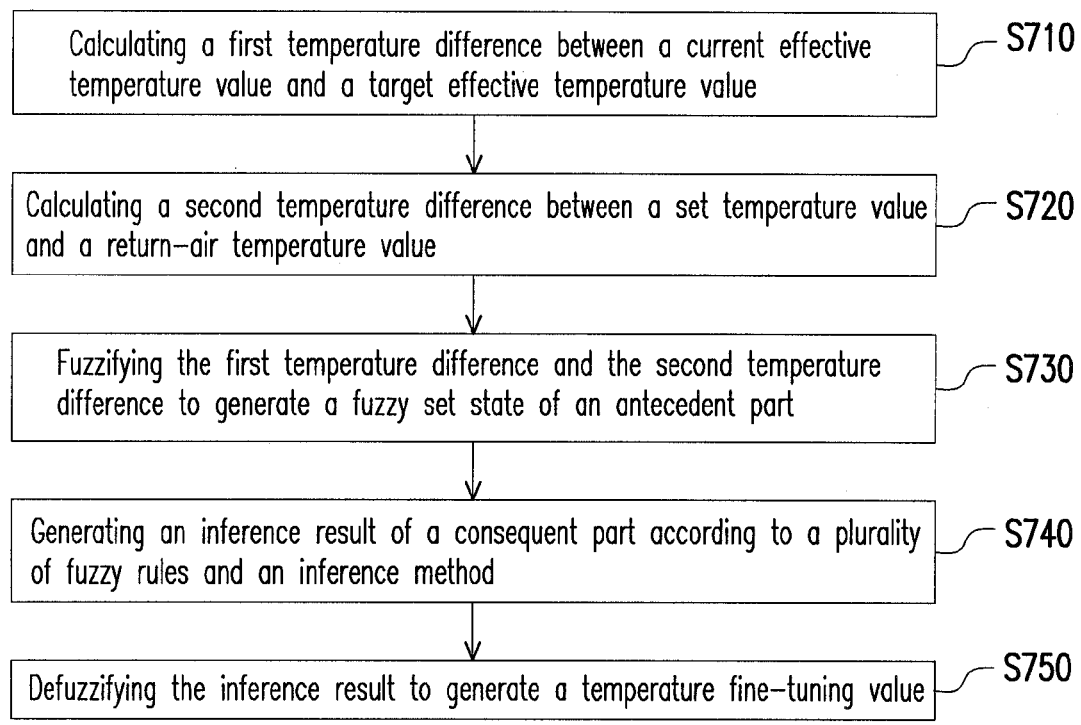
FIG. 7 is a flow chart diagram illustrating step S270 in FIG. 2.

For example, FIG. 6 is a schematic diagram of a fuzzy inference system according to an embodiment of the disclosure, and FIG. 7 is a flow chart diagram illustrating step S270 in FIG. 2. The following description may be referred to FIG. 6 and FIG. 7, in order to observe the structure and operation of the fuzzy inference system in detail. Here, the fuzzy inference system 140 includes a fuzzifier 610, an inference engine 620 and a defuzzifier 630. As shown in step S710, the fuzzifier 610 may calculate a first temperature difference e1 between the current effective temperature value $T_{PRE}$ and the target effective temperature value $T_{TAR}$. Moreover, as shown in step S720, the fuzzifier 610 may also calculate a second temperature difference e2 between the set temperature value $T_{SP}$ and the return-air temperature value $T_{RP}$. Furthermore, as shown in step S730, the fuzzifier 610 may fuzzify the first temperature difference e1 and the second temperature difference e2, so as to generate a fuzzy set state of an antecedent part. Moreover, as shown in step S740, the inference engine 620 may generate an inference result of a consequent part according to a plurality of fuzzy rules and an inference method. In such manner, as shown in step S750, the defuzzifier 630 may defuzzify the inference result, and accordingly generate a temperature fine-tuning value $\Delta T$.

Referring to FIG. 1 and FIG. 2 again, regarding to the temperature fine-tuning value $\Delta T$ generated by the fuzzy inference system 140, the air conditioning control device utilizes the temperature fine-tuning value $\Delta T$ to adjust the set temperature value $T_{SP}$, as shown in step S280. For instance, in the embodiment of FIG. 1, the adder 150 adds the temperature fine-tuning value $\Delta T$ and the set temperature value $T_{SP}$ together, and accordingly generates a corrected temperature value $T_{CT}$. Moreover, the air conditioning controller 130 may utilize the corrected temperature value $T_{CT}$ to update the set temperature value $T_{SP}$, and accordingly further adjust the operating parameters of the air conditioning control device.

According to the above descriptions, the disclosure utilizes the indoor sensing nodes to detect the environment states of the physical space, and employs the three detected environment factors including the temperature, the humidity and the carbon dioxide concentration to define the current effective temperature value and the target effective temperature value, thereby obtaining the temperatures represented the actual feelings of human body. Furthermore, the disclosure further utilizes the set temperature value, the return-air temperature value, the current effective temperature value and the target effective temperature value to adjust the set temperature value automatically. Accordingly, it may be prevented to adjust the set temperature value manually, and achieved both comfort and energy-saving.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An air conditioning control method for an air conditioning control device, the air conditioning control method comprising:
generating a plurality of predetermined state information corresponding to a target comfort index according to environment states outside a physical space;
generating a current state information according to environment states within the physical space, wherein the current state information includes a first temperature data, a first humidity data and a first carbon dioxide concentration data;
utilizing the current state information and the plurality of predetermined state information to calculate a plurality of energy consumptions required by the conversion of states and selecting a target state information from the plurality of predetermined state information according to a minimum energy consumption, when the current state information is different from the plurality of predetermined state information, wherein the step of utilizing the current state information and the plurality of predetermined state information to calculate the plurality of energy consumptions required by the conversion of states comprises:
selecting one of the plurality of predetermined state information, wherein the selected predetermined state information includes a second temperature data, a second humidity data and a second carbon dioxide concentration data;
calculating a first energy for adjusting a temperature of the physical space from the first temperature data to the second temperature data;
calculating a second energy for adjusting a humidity of the physical space from the first humidity data to the second humidity data;
calculating a third energy for adjusting a carbon dioxide concentration of the physical space from the first carbon dioxide concentration data to the second carbon dioxide concentration data; and
calculating the energy consumption corresponding to the selected predetermined state information according to the first energy, the second energy and the third energy;
utilizing the current state information and the target state information to generate a current effective temperature value and a target effective temperature value;
extracting a set temperature value and a return-air temperature value from an air conditioning controller in the air conditioning control device, wherein the air conditioning controller obtains the return-air temperature value through a sensor disposed on a return-air vent of the air conditioning control device;
utilizing the current effective temperature value, the target effective temperature value, the set temperature value and the return-air temperature value to execute fuzzy inference, so as to generate a temperature fine-tuning value; and utilizing the temperature fine-tuning value to adjust the set temperature value.

2. The air conditioning control method as claimed in claim 1, further comprising:
determining whether the current state information is the same as one of the plurality of predetermined state information; and
returning to the step of generating the plurality of predetermined state information corresponding to the target comfort index according to the environment states outside the physical space, when the current state information is the same as one of the plurality of predetermined state information.

3. The air conditioning control method as claimed in claim 1, wherein the step of generating the plurality of predetermined state information corresponding to the target comfort index according to the environment states outside the physical space comprises:
detecting a plurality of environment parameters outside the physical space, and accordingly transmitting an outdoor sensing information;
calculating an optimal state information under an optimal comfort index according to the outdoor sensing information; and
utilizing the optimal state information to obtain the plurality of predetermined state information corresponding to the target comfort index.

4. The air conditioning control method as claimed in claim 3, wherein the step of generating the current state information according to the environment states within the physical space comprises:
detecting the environment parameters within the physical space, and accordingly transmitting a plurality of indoor sensing information; and
utilizing the plurality of indoor sensing information to generate the current state information.

5. The air conditioning control method as claimed in claim 3, wherein the environment parameters comprise a temperature, a humidity and a carbon dioxide concentration.

6. The air conditioning control method as claimed in claim 1, wherein the step of utilizing the current effective temperature value, the target effective temperature value, the set temperature value and the return-air temperature value to execute the fuzzy inference so as to generate the temperature fine-tuning value comprises:
calculating a first temperature difference between the current effective temperature value and the target effective temperature value;
calculating a second temperature difference between the set temperature value and the return-air temperature value;
fuzzifying the first temperature difference and the second temperature difference to generate a fuzzy set state of an antecedent part;
generating an inference result of a consequent part according to a plurality of fuzzy rules and an inference method; and
defuzzifying the inference result to generate the temperature fine-tuning value.

7. The air conditioning control method as claimed in claim 1, wherein the step of utilizing the temperature fine-tuning value to adjust the set temperature value comprises:
adding the temperature fine-tuning value and the set temperature value together, and accordingly generating a corrected temperature value; and
utilizing the corrected temperature value to update the set temperature value.

8. An air conditioning control device, comprising:
a wireless sensing module, generating a plurality of predetermined state information corresponding to a target comfort index according to environment states outside a physical space, and generating a current state information according to environment states within the physical space, wherein the current state information includes a first temperature data, a first humidity data and a first carbon dioxide concentration data;
an effective temperature calculator, wherein when the current state information is different from the plurality of predetermined state information, the effective temperature calculator utilizes the current state information and the plurality of predetermined state information to calculate a plurality of energy consumptions required by the conversion of states, and selects a target state information from the plurality of predetermined state information according to a minimum energy consumption, the effective temperature calculator selects one of the plurality of predetermined state information, the selected predetermined state information includes a second temperature data, a second humidity data and a second carbon dioxide concentration data,
the effective temperature calculator calculates a first energy for adjusting a temperature of the physical space from the first temperature data to the second temperature data, a second energy for adjusting a humidity of the physical space from the first humidity data to the second humidity data and a third energy for adjusting a carbon dioxide concentration of the physical space from the first carbon dioxide concentration data to the second carbon dioxide concentration data,
the effective temperature calculator calculates the energy consumption corresponding to the selected predetermined state information according to the first energy, the second energy and the third energy, and the effective temperature calculator utilizes the current state information and the target state information to generate a current effective temperature value and a target effective temperature value;
an air conditioning controller, obtaining a return-air temperature value through a sensor disposed on a return-air vent of the air conditioning control device;
a fuzzy inference system, extracting a set temperature value and the return-air temperature value from the air conditioning controller, and utilizing the current effective temperature value, the target effective temperature value, the set temperature value and the return-air temperature value to execute fuzzy inference, so as to generate a temperature fine-tuning value; and
an adder, adding the temperature fine-tuning value and the set temperature value together, and accordingly generating a corrected temperature value, and the air conditioning controller utilizing the corrected temperature value to update the set temperature value.

9. The air conditioning control device as claimed in claim 8, wherein the effective temperature calculator further determines whether the current state information is the same as one of the plurality of predetermined state information.

10. The air conditioning control device as claimed in claim 8, wherein the wireless sensing module comprises:
an outdoor sensing node, disposed outside the physical space and detecting a plurality of environment parameters outside the physical space, and accordingly transmitting an outdoor sensing information;
a plurality of indoor sensing nodes, disposed within the physical space and detecting the environment parameters within the physical space, and accordingly transmitting a plurality of indoor sensing information;

a wireless data collector, receiving the outdoor sensing information and the plurality of indoor sensing information, and storing the outdoor sensing information and the plurality of indoor sensing information in an environment database; and a comfort index building module, calculating an optimal state info nation under an optimal comfort index according to the outdoor sensing information, and utilizing the optimal state information to obtain the plurality of predetermined state information corresponding to the target comfort index, and the comfort index building module further utilizing the plurality of indoor sensing information to generate the current state information.

11. The air conditioning control device as claimed in claim 10, wherein the environment parameters comprise a temperature, a humidity and a carbon dioxide concentration.

12. The air conditioning control device as claimed in claim 10, wherein the outdoor sensing node and the indoor sensing nodes respectively comprises:

a temperature sensor, detecting a temperature of a surrounding environment;

a humidity sensor, detecting a humidity of the surrounding environment;

a carbon dioxide sensor, detecting a carbon dioxide concentration of the surrounding environment; and a wireless transmission module, collecting the data detected by the temperature sensor, the humidity sensor and the carbon dioxide sensor, and accordingly transmitting the collected information.

13. The air conditioning control device as claimed in claim 8, wherein the fuzzy inference system comprises:

a fuzzifier, calculating a first temperature difference between the current effective temperature value and the target effective temperature value and calculating a second temperature difference between the set temperature value and the return-air temperature value, wherein the fuzzifier fuzzifies the first temperature difference and the second temperature difference, so as to generate a fuzzy set state of an antecedent part;

an inference engine, generating an inference result of a consequent part according to a plurality of fuzzy rules and an inference method; and a defuzzifier, defuzzifying the inference result to generate the temperature fine-tuning value.

\* \* \* \* \*